United States Patent [19]
Azuma et al.

[11] Patent Number: 5,499,145
[45] Date of Patent: Mar. 12, 1996

[54] MAGNETIC RECORDING APPARATUS WITH CAPABILITY OF RECORDING SIGNALS OF A PLURALITY OF DIFFERENT TELEVISION SYSTEMS

[75] Inventors: Nobuo Azuma, Yokohama; Takashi Furuhata, Kamakura; Katsumi Takeda; Hiroaki Takahashi, both of Yokohama, all of Japan

[73] Assignee: Hitachi, Ltd., Tokyo, Japan

[21] Appl. No.: 151,790

[22] Filed: Nov. 15, 1993

Related U.S. Application Data

[63] Continuation of Ser. No. 799,953, Nov. 29, 1991, abandoned.

[30] Foreign Application Priority Data

Nov. 30, 1990 [JP] Japan .................. 2-329103

[51] Int. Cl.$^6$ .................................. H04N 5/78
[52] U.S. Cl. ............... 360/33.1; 360/73.04; 358/335
[58] Field of Search .............. 360/27, 48, 33.1, 360/9.1, 10.3, 92, 73.04; 358/12, 335

[56] References Cited

U.S. PATENT DOCUMENTS

| | | | |
|---|---|---|---|
| 4,586,093 | 4/1986 | Fukuju et al. | 360/73 |
| 4,811,122 | 3/1989 | Kido et al. | 360/25 |
| 4,963,991 | 10/1990 | Honjo | 358/310 |
| 4,991,027 | 2/1991 | Enoki | 358/330 |
| 5,055,915 | 10/1991 | Tsinberg | 358/12 |
| 5,065,259 | 11/1991 | Kubota et al. | 360/32 |
| 5,223,944 | 6/1993 | Shimada et al. | 358/330 |

FOREIGN PATENT DOCUMENTS

| | | |
|---|---|---|
| 0228240 | 7/1987 | European Pat. Off. . |
| 0309876 | 4/1989 | European Pat. Off. . |
| 0337650 | 10/1989 | European Pat. Off. . |
| 0375365 | 6/1990 | European Pat. Off. . |
| 0410489 | 1/1991 | European Pat. Off. . |
| 0417609 | 3/1991 | European Pat. Off. . |
| 59-223463 | 12/1984 | Japan . |

*Primary Examiner*—Andrew L. Sniezek
*Attorney, Agent, or Firm*—Antonelli, Terry, Stout & Kraus

[57] ABSTRACT

A magnetic recording apparatus of the rotary head helical scan type which can selectively record input information signals of a plurality of signal formats includes an input signal kind discriminating circuit, a controller for generating control output signals to set each section of the magnetic recording apparatus into a predetermined mode on the basis of a recording mode command, a recording signal processing circuit which is respectively switched to a predetermined mode in accordance with an output signal of the controller, and a servo control circuit, wherein there is an effect such that one magnetic recording apparatus can automatically record the input signals of a plurality of formats such as an NTSC signal, an HD signal, and the like in the optimum mode by a simple and easy to use method.

19 Claims, 7 Drawing Sheets

FIG. I

HD SIGNAL WAVEFORM

NTSC WAVEFORM

FRONT VIEW

PLAN VIEW (CROSS SECTION)

TO CONTROLLER

PLAN VIEW (CROSS SECTION)

TO CONTROLLER

CASSETTE

MAGNETIC RECORDING APPARATUS WITH CAPABILITY OF RECORDING SIGNALS OF A PLURALITY OF DIFFERENT TELEVISION SYSTEMS

This application is a continuation of application Ser. No. 799,953, filed on Nov. 29, 1991, now abandoned.

BACKGROUND OF THE INVENTION

The invention relates to a magnetic recording apparatus which can selectively record input information signals of a plurality of signal formats.

A video tape recorder (abbreviated to a VTR) of the rotary head helical scan type as a home-use magnetic recording and reproducing apparatus has been considered so far on the assumption of the NTSC system (PAL, SECAM systems in Europe) as a standard television signal format. In recent years, however, the realization of practical use of the EDTV (Extended Definition TV) system as an improved type of the standard television signal format is being developed and the development and the realization of practical use of the HDTV (High Definition TV) system as a high definition (also referred to as a high precision) television system of a higher quality are also being developed. The techniques regarding the HDTV system and HDTV-VTR have been disclosed in "The Special Edition, Television Annual Report, 4-2, HDTV (High Vision)", the magazine of The Institute of Television Engineers of Japan, Vol. 42, No. 7 (1988), pages 655–657, and in "The Special Edition, Television Annual Report, 4, Image Information Recording", the magazine of the Institute of Television Engineers of Japan, Vol. 44, No. 7 (1990), pages 840–846. The HDTV-VTRs of various kinds of systems such as an analog recording system, a digital recording system, and the like have been introduced in the above literatures. All of the above various kinds of HD (High Definition) VTRs are the magnetic recording and reproducing apparatuses which are specially used only for a high definition television signal.

That is, in the above conventional VTRs, nothing is considered with respect to the recording and reproduction of signals other than the high definition television signal. Particularly, those VTRs don't have the conventional standard television signal recording function which is strongly demanded in the home-use VTR.

Further, the realization of practical use of the EDTV system (the realization of a wide screen is also examined) as an improved type of the standard television system is also being developed at present. It is inconvenient to provide a VTR corresponding to each of the television systems as a home-use VTR in terms of both costs and space.

SUMMARY OF THE INVENTION

It is an object of the invention to provide a magnetic recording apparatus in which one apparatus copes with input signals of a plurality of television signal formats and cassettes of a plurality of shapes as necessary and can record images of the standard NTSC system and the high definition HDTV system in a simple and easy to use method.

To accomplish the above object, the invention provides a construction having control means for discriminating an optimum recording mode from the results of the discriminations of kind discriminating means of a plurality of input signals, kind discriminating means of a plurality of kinds of cassettes as necessary, and a desired recording mode command of the user and for setting each section into a predetermined mode.

On the other hand, means for displaying the present recording state is provided in order to inform the present available recording modes to the user, thereby making it impossible for the user to select an improper recording mode and enabling the user to set the recording mode in accordance with an order beginning with a high priority mode.

With the above construction, the signal format of the input signal supplied to the magnetic recording apparatus is discriminated by the input signal kind discriminating means and the kind of cassette is discriminated by the cassette kind discriminating means as necessary and the present available recording mode is displayed by the display means. It is sufficient that the user selects a desired recording mode among the modes displayed. On the basis of the selected recording mode, the control means switches each section such as recording signal processing means, servo control means, and the like of the magnetic recording apparatus into a predetermined mode. The servo control means changes a magnetic tape speed and a drum rotational speed to the magnetic tape speed and drum rotational speed corresponding to the format of the signal to be recorded.

Consequently, there is an effect such that one magnetic recording apparatus can cope with a complicated combination of a plurality of kinds of input signals such as a high definition signal, a standard signal, and the like and cassettes of a plurality of shapes by a simple and easy to use method.

DESCRIPTION OF THE PREFERRED EMBODIMENTS

An embodiment of a magnetic recording apparatus according to the invention will be described hereinbelow with reference to a block diagram of FIG. 1.

Figure 1:
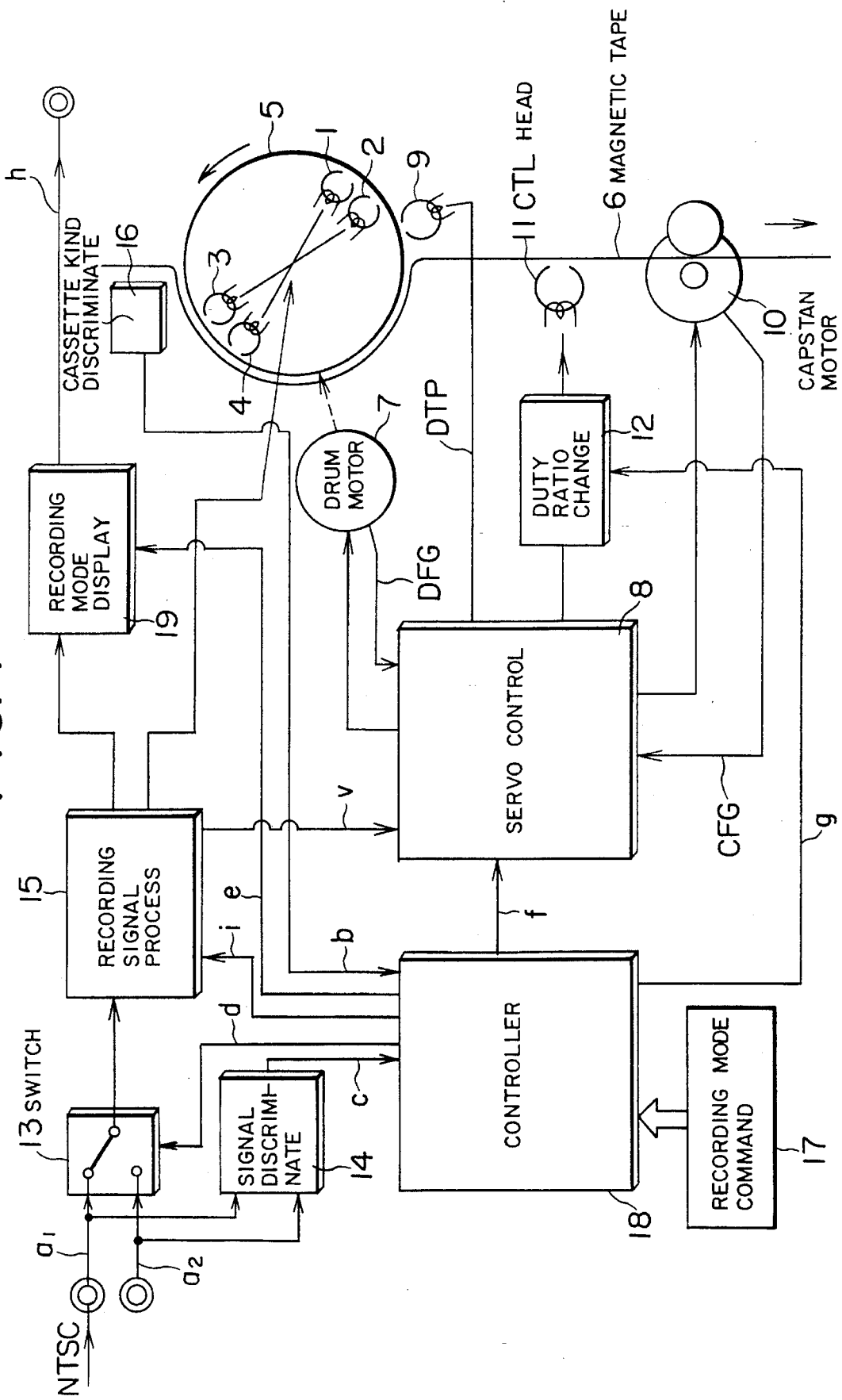
FIG. 1 is a block diagram of a magnetic recording apparatus according to an embodiment of the invention.

In FIG. 1, reference numerals 1, 2, 3, and 4 denote rotary heads, attached onto a rotary drum 5, for recording or reproducing a video signal; 6 a magnetic tape enclosed in a cassette; 7 a drum motor from which a signal DFG indicative of a rotational frequency is extracted; 8 a servo control circuit; 9 a drum tach head to detect a signal DTP indicative of a rotational phase of each rotary head; 10 a capstan motor; 11 a control (referred to as CTL) head to record or reproduce a control signal for tracking; 12 a circuit to change a duty ratio of the CTL signal on the basis of kind information of the input signal to be recorded; 13 a switch to switch between a standard NTSC signal $a_1$ and a high definition HD signal $a_2$ (the diagram shows a state in which only the NTSC signal is supplied); 14 a signal discriminating circuit to discriminate the kind of input signal; 15 a recording signal processing circuit (which includes both of the cases of the analog recording and the digital recording and supplies a sync. signal V to the servo control circuit 8) to process the signals $a_1$ and $a_2$ into formats which can be recorded onto the magnetic tape 6; 16 a cassette kind discriminator (which is constructed by a switch or the like to detect the presence or absence of a discrimination hole formed in the cassette); 17 means for instructing a desired recording mode by the user; and 18 a controller (control means) for generating output signals to change and set a mode of each section of the magnetic recording apparatus into a desired mode. The controller 18 is constructed by a microcomputer having therein a control program (the controller may be also constructed by random logic). Reference numeral 19 denotes a recording state display section to display the present recording state (the kind of cassette, the kind of input signal, several available recording modes or the recording mode which has already been selected by the user, the information indicating whether the apparatus is in the recording mode or not, etc.) by an output signal $\underline{e}$ from the controller. The display section 19 generates a monitor signal $\underline{h}$ in the recording mode by multiplexing it to the video signal which is generated from the recording signal processing circuit 15 and displays it on a monitor display (the signal can be also displayed by a display lamp).

Figure 2:
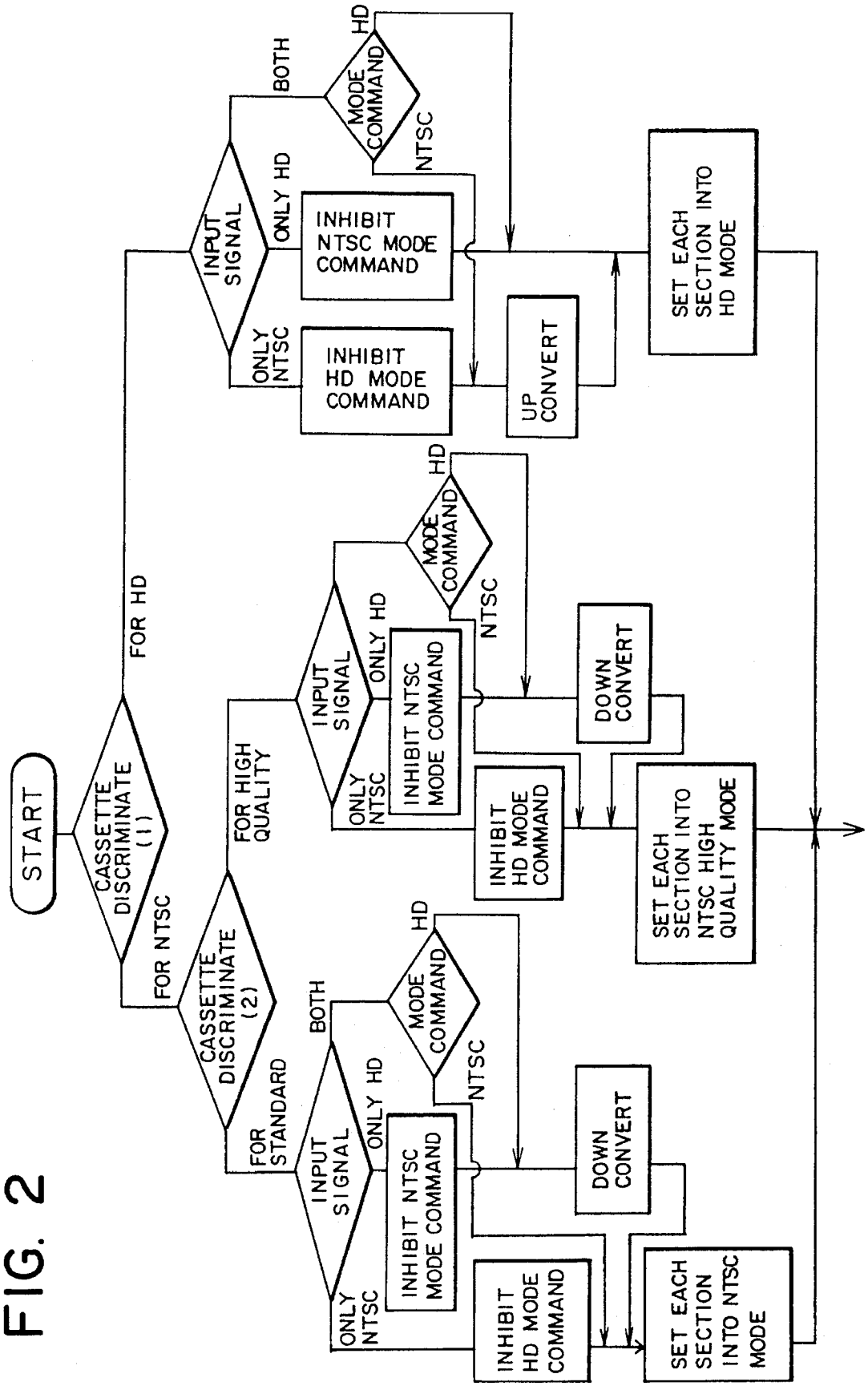
FIGS. 2 and 5 are flowcharts for explaining the operation of FIG. 1.

FIG. 2 shows an example of a flowchart for recording input signals of a plurality of signal formats by desired states suitable for a plurality of kinds of cassettes. The operation of FIG. 1 will be described with reference to FIG. 2.

The controller 18 first discriminates (cassette discrimination (1) and cassette discrimination (2) in FIG. 2) the kind of cassette inserted on the basis of an output $\underline{b}$ of the discriminator 16. That is, the controller 18 discriminates whether the cassette is a cassette for the high definition HD signal or a cassette for the existing NTSC signal on the basis of a combination of the discrimination holes formed in the cassettes (projections formed on the cassettes may also be used) on the basis of a combination of the discrimination holes formed in the cassettes (projections formed on the cassettes may also be used). It is noted that there are two kinds of VHS types such as a standard VHS type and an S-VHS type for a high picture quality in which magnetic characteristics of magnetic tapes in the cassettes differ. In the following description, those two kinds of VHS types are referred to as a standard type and a high quality type.

For instance, in the case of the standard type cassette for the NTSC, the controller discriminates the kind of input signal by the signal discriminating circuit 14. FIG. 1 shows the case where only the NTSC signal is supplied as a signal $a_1$ to the input terminal for the NTSC. The signal discriminator 14 discriminates the kind (whether it is only the NTSC, only the HD, both of the NTSC and the HD, or the like) on the basis of the form of the sync. signal of the input signal, the difference of frequency, of the like and sends an output $\underline{c}$ to the controller 18. As in the above example, when the NTSC signal and the HD signal are supplied to the independent input terminals, the kind of input signal can be also detected only by checking the presence or absence of the signal at each terminal (it is sufficient to detect the DC component of the signal). It is also possible to construct the apparatus in a manner such that one input terminal is used and both of the composite NTSC format signal and the high definition MUSE format signal are received by one input terminal. In such a case, it is also necessary to discriminate by the sync. signal detection. Although FIG. 1 shows the case where the input signal of the high definition HD is shown as one representative signal $a_2$, a plurality of input terminals are provided in the case of inputting the signal of the high definition base band format (luminance Y, chromaticities $P_b$ and $P_r$, and the like). Since only the NTSC signal is supplied in the case of FIG. 1, the controller executes an inhibiting process so as to make it impossible for the user to instruct the HD mode, thereby preventing an inconvenience such that the NTSC signal is recorded in the HD format.

Since the above recording modes are displayed on the monitor display, the user selects a desired recording mode in a menu manner from the displayed available selection items under the conditions at the present time point (the optimum combination according to each case has previously been programmed in the controller 18). On the other hand, when the initial setting state is provided and such a state is selected, the recording mode of the present highest priority among the present available recording modes is set (only the recording of the image can be performed as a temporary measure even in the case where the user waives in the setting).

In the case of FIG. 1, since only the selection item of the recording in the NTSC mode is left, the controller 18 automatically sets each section into the NTSC mode and completes the mode setting. The recording signal processing circuit 15 is set into the NTSC mode by an output $\underline{i}$ of the controller 18. Similarly, the servo control circuit 8 is set into the NTSC mode by an output $\underline{f}$. The switch 13 is set to the upper side by an output $\underline{d}$ of the controller 18 and the NTSC signal $a_1$ is selected as an input signal. After that, when the user instructs the image recording mode, the image is recorded on the magnetic tape 6.

Figure 3:
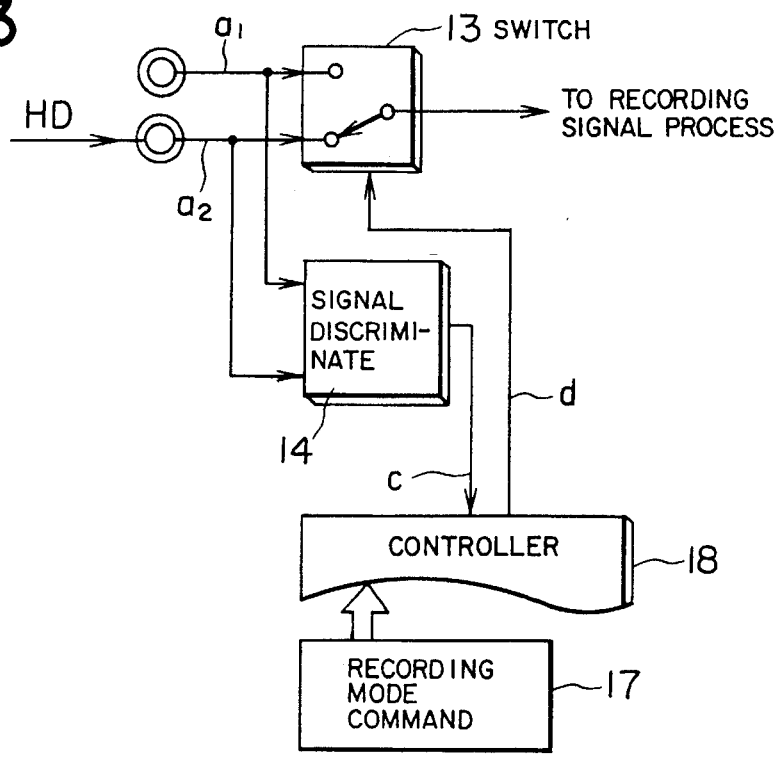
FIGS. 3 and 4 are block diagrams for explaining the discrimination of an input signal.

The case where only the high definition HD signal is supplied to the switch 13 as an input signal $a_2$ as shown in a block diagram of FIG. 3 will now be similarly described with reference to the flowchart of FIG. 2. In FIG. 3, the same component elements as those in FIG. 1 are designated by the same reference numerals and characters (the same shall also apply hereinbelow). In the example of FIG. 3, only the HD signal is supplied, in the case of the standard type cassette for the NTSC, the kind of input signal is discriminated by the signal discriminating circuit 14 and the information indicating that the input signal is only the HD signal is transmitted to the controller 18. The controller 18 sets the switch 13 to the lower side by the output $\underline{d}$, thereby allowing the HD signal $a_2$ to be selected. After that, the NTSC mode command is inhibited and the number of scanning lines of the high definition HD signal as an output of the switch 13 is converted into the number of scanning lines of the standard NTSC signal (from 1125 scanning lines to 525 scanning lines: such a conversion is generally called a down conversion) by the recording signal processing circuit 15 so that the signal can be recorded onto the magnetic tape of the standard type cassette. After that, each section is set into the NTSC mode.

Figure 4:
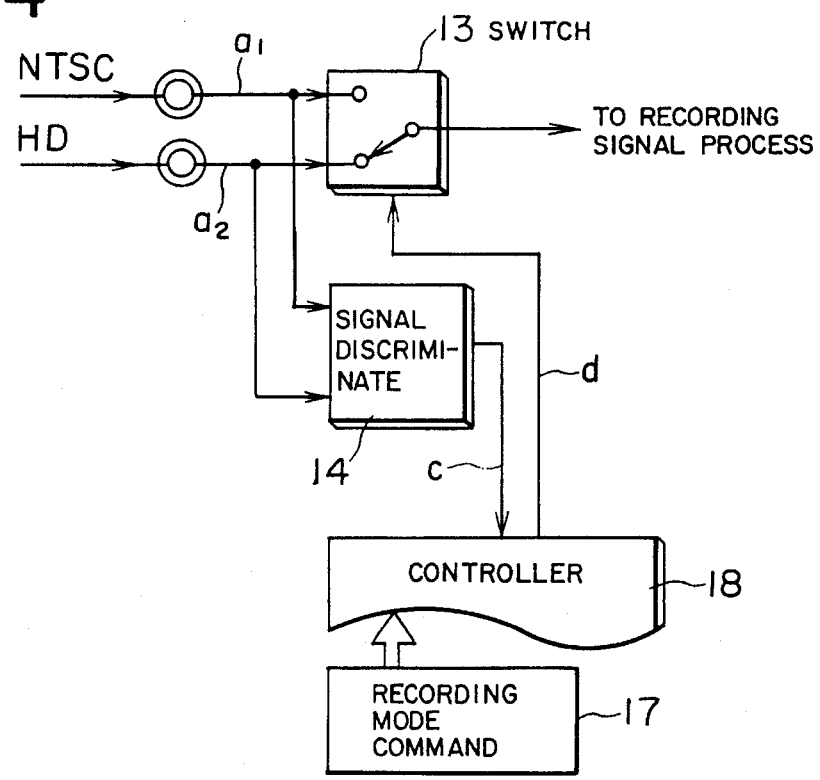

As shown in a block diagram of FIG. 4, the case where both of the NTSC signal and the high definition HD signal are supplied as input signals will now be similarly described. In the example, since both types of input signals are supplied, a possibility of selection by the user remains. The user therefore instructs which one of the NTSC signal and the HD signal should be recorded on the standard type cassette by the recording mode instructing means 17 (when the initial setting state is selected, the NTSC mode is used as a recording mode command). After that, in the case of the NTSC mode, the input signal is directly transmitted. In the case of the HD mode, the signal is down-converted. After that, each section is set into the NTSC mode.

When it is determined in the cassette discrimination (2) that the cassette is a high quality cassette, the operation similar to that described above is executed as shown in FIG. 2 and each section is set into the NTSC high quality mode.

When it is determined in the cassette discrimination (1) that the cassette is an HD cassette (having therein a metal tape corresponding to a wide band), the input signal is first discriminated. In the case of only the NTSC signal, the HD mode instruction is inhibited and the number of scanning lines of the NTSC signal is converted into the number of scanning lines of the signal (pseudo HD signal) corresponding to the high definition HD format (such a conversion is called an up conversion). After that, each section is set into the HD mode (also including a pseudo HD mode in which parameters of the respective sections slightly differ). In the case of only the HD signal, each section is automatically set into the HD mode. In the case of both of the NTSC signal and the HD signal, either one of the mode in which the NTSC signal is up-converted and each section is set into the HD mode and the mode in which the HD signal is directly transmitted as it is and each section is set into the HD mode is selected in accordance with an instruction of the user.

Figure 5:
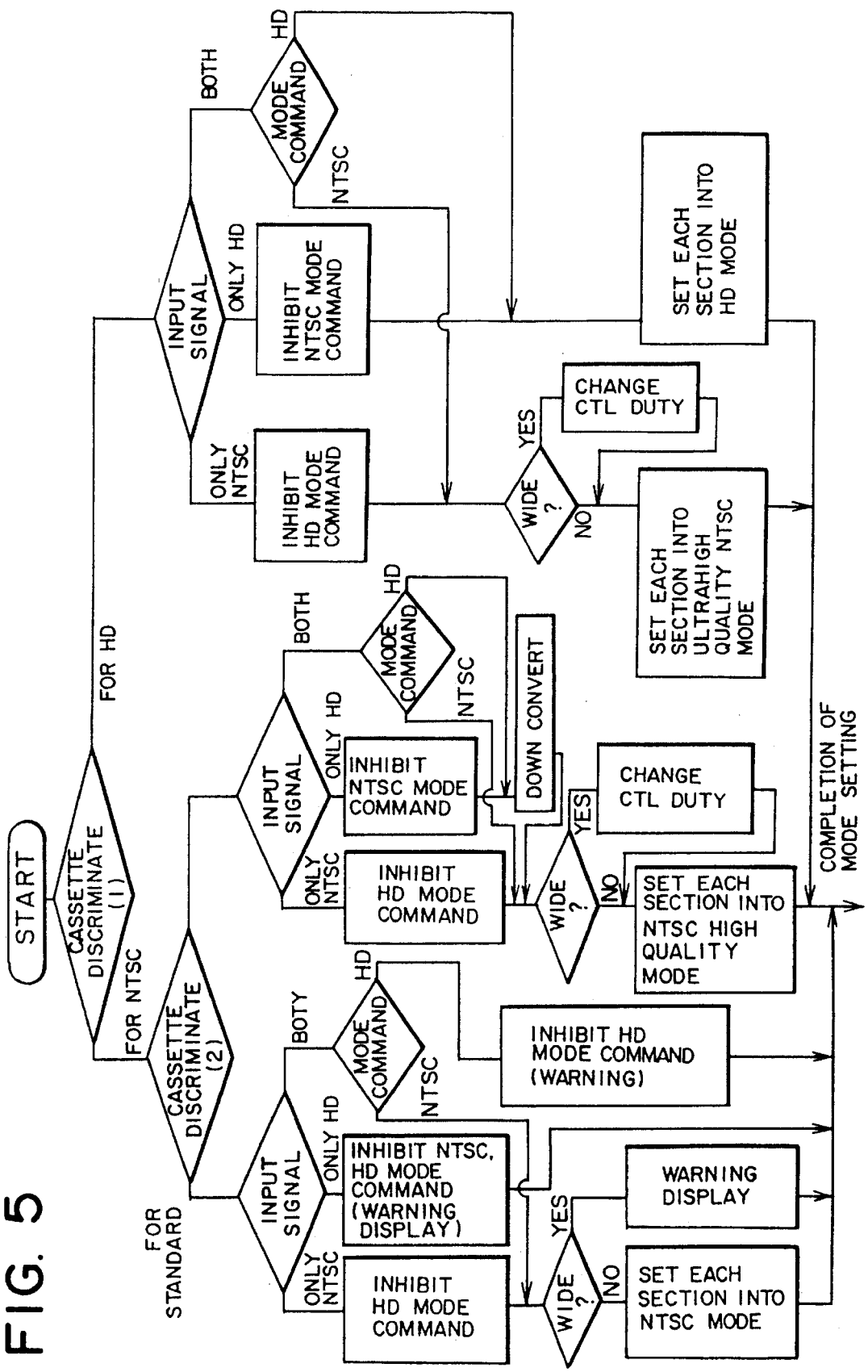

Another embodiment of FIG. 1 will now be described with reference to a flowchart of FIG. 5. The operation by the flowchart of FIG. 2 is shown as one example. FIG. 5 shows an example of another operation. Since the fundamental operation is similar to that of FIG. 2, only the different portions will be explained. In the example of FIG. 2, the signal can certainly be recorded to any cassette. In the example of FIG. 5, the recording is inhibited in the improper case and such an inhibiting state is warned and displayed on the monitor display (or, the cassette may be also ejected out of the apparatus). For instance, in the case where the cassette is a standard type cassette for the NTSC and only the HD signal or both of the NTSC signal and the HD signal are supplied as an input signal or input signals and the user tries to instruct the HD recording mode, the recording inhibition is warned and displayed.

It is another different point from the case of FIG. 2 that although the apparatus is based on the NTSC format, it corresponds to the NTSC wide mode in which only the aspect ratio (ratio of the lateral size to the vertical size of the screen) is set to 16:9 (the aspect ratio of the standard NTSC system is set to 4:3 and such an NTSC wide mode is being examined in the foregoing EDTV system). In the case of the wide mode, although the NTSC format is used, since the screen information is compressed by the aspect ratio times, it is desirable to use the high quality type cassette in the two kinds of NTSC cassettes in order to record the signal without deteriorating the resolution. For this purpose, the inhibition and warning are performed so that not only the HD signal but also the NTSC wide signal cannot be recorded to the standard type cassette as shown in FIG. 5. In the case of using a high quality type tape, the HD signal is down-converted. In the case of the NTSC signal or the NTSC wide signal, the signal is directly transmitted. Then, each section is set into the NTSC high quality mode. An indication of whether the aspect ratio is the normal ratio (standard NTSC signal) or the wide type is recorded onto the magnetic tape. The duty ratio changing circuit 12 is made operative by a signal g in FIG. 1 and the duty ratio of the CTL signal is changed via the CTL head 11. The above process is significant because there are many cases where the difference of the aspect ratio, particularly for the NTSC format signal, cannot be known from the video signal.

When the HD type cassette is used, in the case where the HD signal is supplied as an input signal, the HD signal is directly transmitted as it is and each section is set into the HD mode. In the case of the NTSC signal also including the wide mode, the mode is set into another NTSC ultrahigh quality mode (the tape speed and the drum rotational speed are also changed to predetermined values) whose quality is further higher than that of the NTSC high quality mode and which makes the most of the wide band characteristics of the HD type metal tape.

The cassette kind discriminating means 16 in FIG. 1 discriminates the kind of cassette by the discrimination holes or projections formed in/on the cassette. However, the kind of cassette can be also discriminated by a difference of magnetic characteristics of the magnetic tape 6 in the cassette. For instance, to discriminate the difference between the oxide tape and the metal tape, a predetermined signal is once written upon insertion of the cassette, the predetermined signal is read out just after it was written, and a magnitude of the reproduction level is detected.

The above explanation has been made with respect to the case of using two kinds of magnetic tapes having different magnetic characteristics for the HD system and NTSC system. However, the invention can be also similarly considered in the case where, for instance, the kind of magnetic tape is limited to only the HD type and only the tape lengths are different, or the like.

Figure 6:
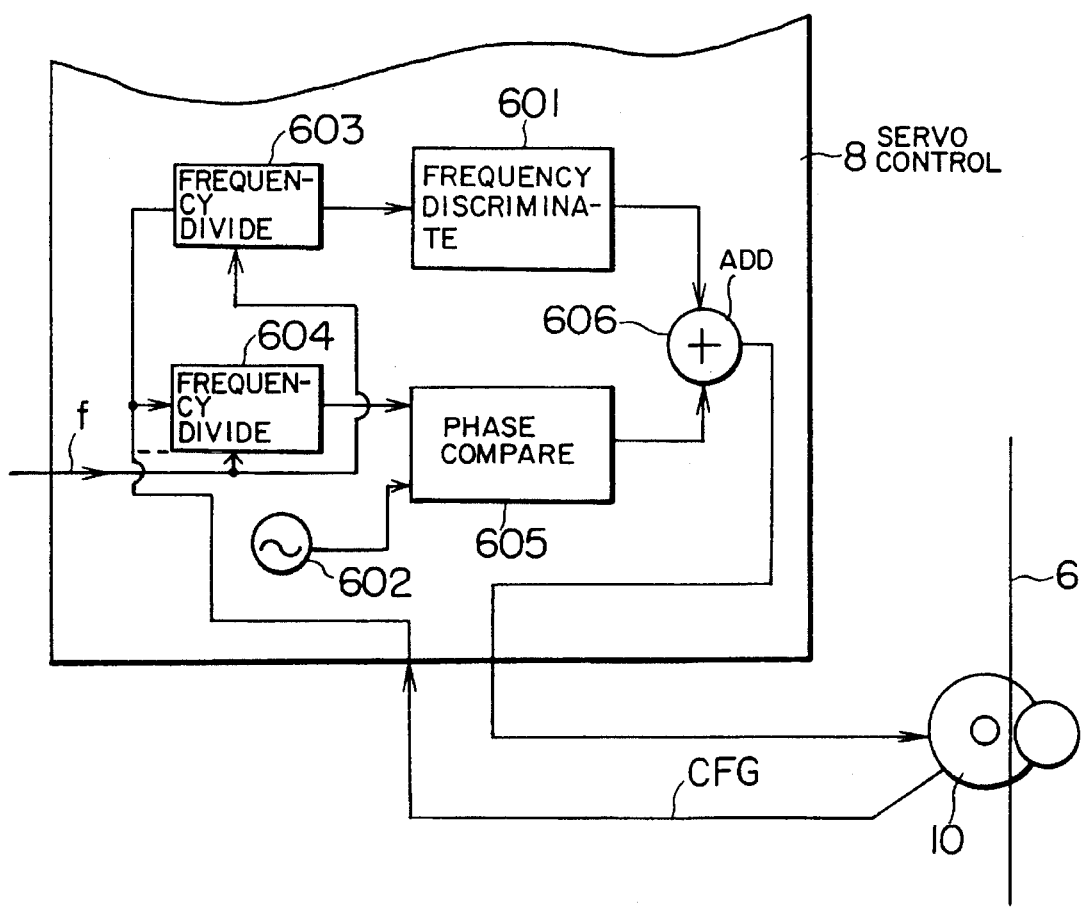
FIG. 6 is a block diagram for explaining a servo control circuit.

A practical constructional example of the servo control means 8 will now be described with reference to a block diagram of a capstan servo control portion in FIG. 6. In FIG. 6, the capstan servo control portion is constructed by a frequency discriminator 601, a reference signal source 602, frequency dividers 603 and 604, a phase comparator 605, and an adder 606. A signal $\underline{f}$ which is set to the high "H" level when the recording mode is the HD mode and to the low "L" level in the NTSC recording mode is supplied from the controller 18. When the signal $\underline{f}$ is at the "L" level, namely, in the NTSC mode, a signal CFG indicative of the rotational frequency is extracted from the capstan motor 10 and is transmitted through the frequency divider 603 (having the frequency dividing ratio for the NTSC system). An output signal of the frequency divider 603 is supplied to the frequency discriminator 601 and is subjected to a speed control loop such as to make the input frequency constant. On the other hand, with respect to a phase control loop as well, the signal is controlled by using the phase comparator 605 so that the phase of the frequency signal of the reference signal source 602 coincides with the phase of the signal in which the signal CFG has been frequency divided by the frequency divider 604 (having the frequency dividing ratio for the NTSC system). Outputs of the frequency discriminator 601 and phase comparator 605 are supplied to the adder 606. An output signal of the adder 606 is supplied to the capstan motor 10, thereby keeping the tape speed in the NTSC mode constant.

When the signal $\underline{f}$ is at the "H" level, namely, in the HD mode, the frequency dividing ratios of the frequency dividers 603 and 604 are changed to the ratios for the HD mode and the tape speed is changed to the speed in the HD mode which is higher than the tape speed in the NTSC mode (for instance, double speed). With respect to the drum rotational speed as well, the set speed in a drum servo control section (not shown) in the servo control circuit 6 is similarly changed to the drum rotational speed (for example, two times or four times), thereby coping with the wide band recording.

Figure 7A:
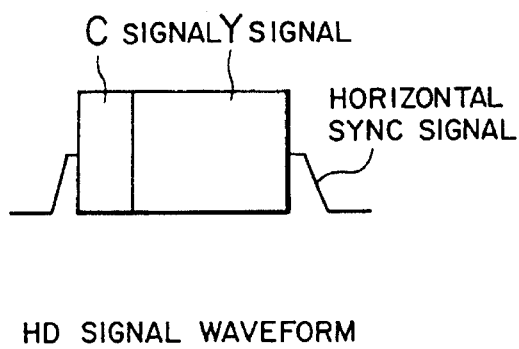
FIGS. 7A and 7B are input signal waveform diagrams.
Figure 7B:
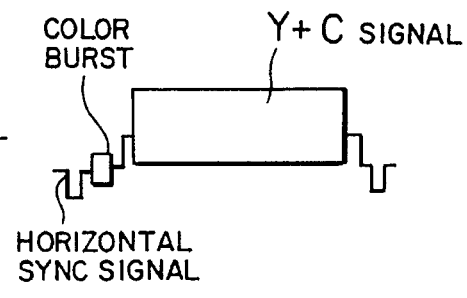

An example of a practical discrimination of the signal discriminating circuit 14 in FIG. 1 will now be described. Explanation will now be made on the assumption that the MUSE format signal of the high definition HD system and the NTSC signal are the kinds of signals to be discriminated. FIGS. 7A and 7B show waveforms of the HD and NTSC signal (C denotes a color signal and Y indicates a luminance signal). Since the waveforms of those horizontal sync. signals differ, the NTSC signal can be discriminated by checking, for instance, whether a negative polarity sync. signal exists at a level which is equal or lower than a predetermined level or not. On the other hand, since the frequencies of the horizontal sync. signals of the HD and NTSC signals are set to 33.75 kHz and 15.734 kHz, the NTSC signal can be also discriminated by a frequency difference between them.

Figure 8A:
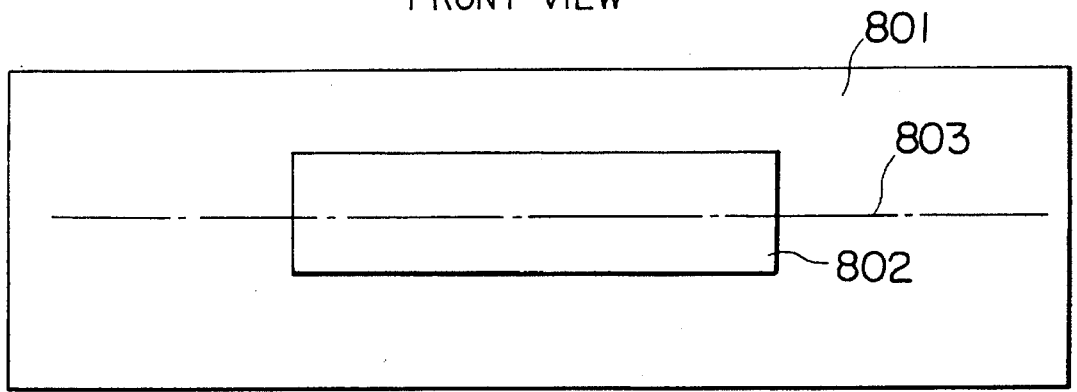
FIGS. 8A, 8B, 8B', 8C, 9, and 10 are explanatory diagrams of inserting mechanisms of various kinds of cassettes.
Figure 8B:
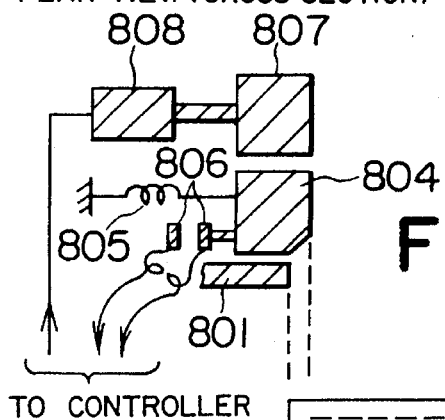
Figure 8B:
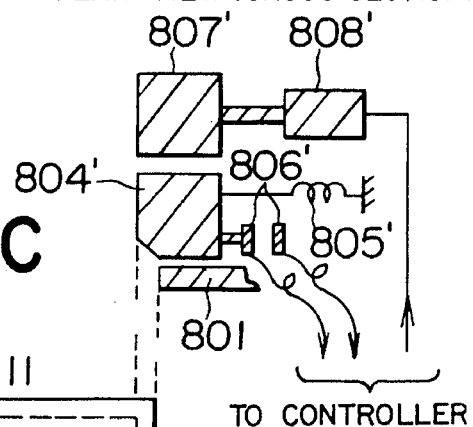
Figure 8C:
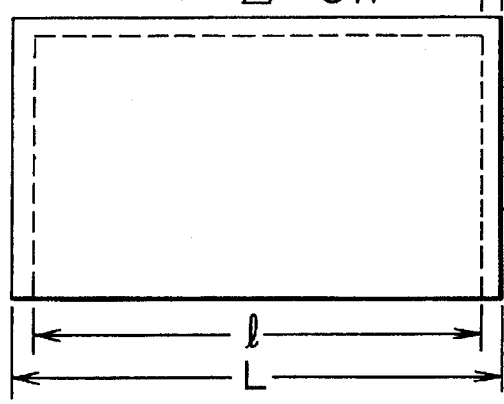

Another embodiment will now be explained with reference to FIGS. 8A, 8B, 8B', and 8C. The embodiment relates to the case where the shapes of the HD type cassette and standard type cassette are different. The signal can be recorded or reproduced to/from both of the cassettes. FIG. 8A is a diagram when an external shape of a front panel 801 of the magnetic recording apparatus is seen from the front side. Reference numeral 802 denotes a cassette inserting port. FIGS. 8B and 8B' are plan views when the portion near the cassette inserting port is seen from the upper surface in a state in which the magnetic recording apparatus is cut out along an alternate long and short dash line 803. FIG. 8C shows an HD type cassette 809 (whose lateral width is set to L: a size and a lateral width l of the NTSC type cassette are shown by a broken line). A size of cassette inserting port (or inserting window) 802 is set to a size large enough to insert the HD type cassette. In FIG. 8B, reference numerals 804 and 804' denote movable members to which springs 805 and 805' and switches 806 and 806' are attached. Reference numerals 807 and 807' denote members whose positions can be changed by solenoids 808 and 808'. The switches 806 and 806' and the solenoids 808 and 808' are connected to the controller 18. FIGS. 8B and 8B' show states in the case where the NTSC type cassette is inserted. The cassette is inserted in the direction of an arrow 811.

Figure 9:
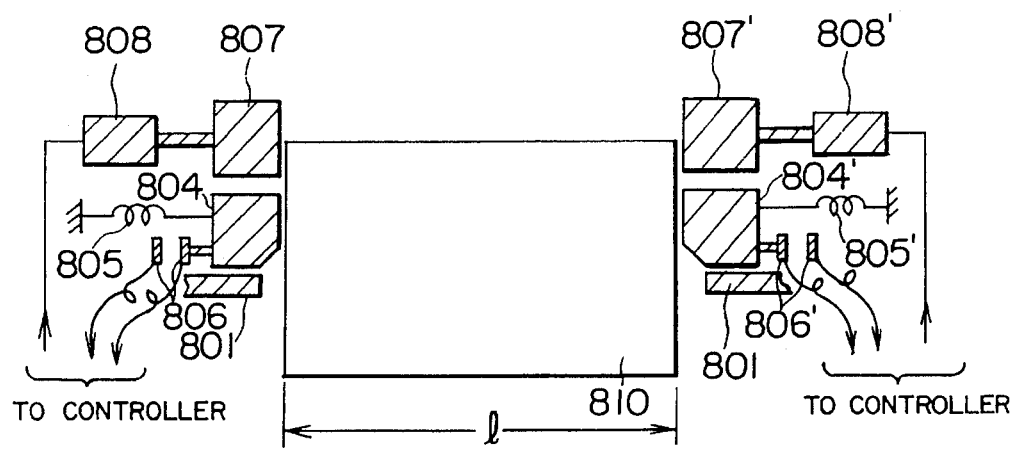

FIG. 9 is a diagram showing a state in which an NTSC type cassette 810 has been inserted. Since an interval between the members 807 and 807' is set to l, the cassette is directly inserted. As a subsequent tape loading mechanism, the same mechanism can be commonly used so long as an interval between two reels in the HD type cassette and that in the NTSC type cassette are made coincident.

Figure 10:
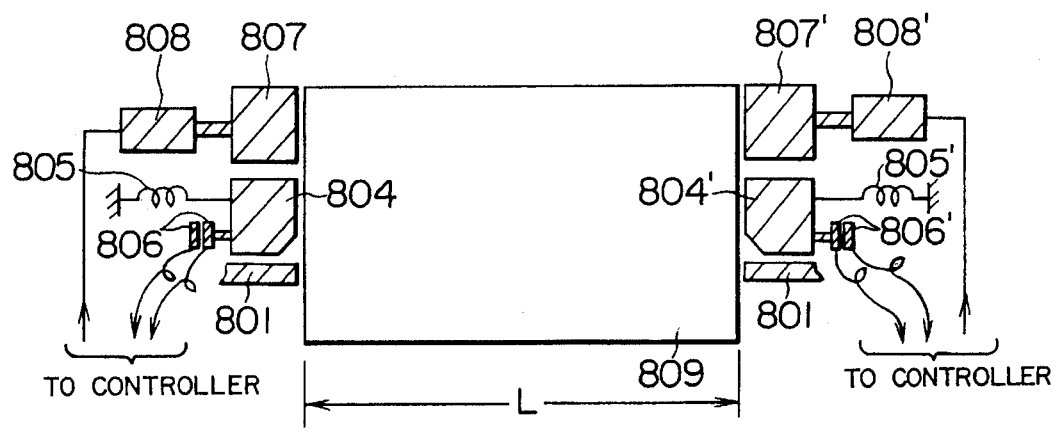

FIG. 10 is a diagram showing a state in which the HD type cassette 809 is inserted. The movable members 804 and 804' are pushed and widened until an interval between them is equal to L, so that the switches 806 and 806' are closed. Outputs of the switches 806 and 806' are detected by the controller 18, so that the controller 18 determines that the loaded cassette is an HD cassette. The solenoids 808 and 808' are made operative and the interval between the members 807 and 807' is changed to L, thereby enabling the HD cassette 808 to be inserted.

In general, there is a case where the cassette is constructed in a manner such that an opposite-side insertion preventing mechanism is formed on the front surface cover or the like of the cassette so that the cassette cannot be inserted in the opposite direction with respect to the front/rear directions and the opposite-side insertion is blocked by a preventing pin provided on the main body side. In such a case, the position of such a preventing pin for the HD type cassette is also commonly used as a position of the pin for the NTSC type cassette. The cassette is restricted by the movable members 804 and 804' and the like so that the cassette can be inserted in a manner such that the central position of the lateral width of the HD cassette and the center of the cassette inserting window of the main body are made coincident with those of the NTSC cassette (a structure in which the above preventing pin is arranged at the center of the cassette inserting window is ordinarily used; however, such a position is not necessarily limited to the center), thereby preventing the opposite-side insertion.

By changing the shape of the HD cassette as mentioned above, the magnetic recording apparatus according to the invention can selectively use both of the existing NTSC cassette and the HD cassette. In addition, it is possible to realize what is called a host compatibility such that a new HD cassette cannot be inserted into the existing NTSC apparatus.

The present invention can be also embodied by embodiments other than the foregoing embodiments without departing from the spirit or main feature of the invention. The above embodiments, therefore, are nothing but mere examples of the invention in all points and should not be limitedly interpreted. The purview of the invention is shown by the scope of the claims. Further, variations and modifications belonging to the equivalent range of the scope of the claims are all incorporated in the scope of the invention.

What is claimed is:

1. A magnetic recording apparatus of the rotary head helical scan type which can selectively record input information signals of a plurality of signal formats, comprising:

input signal kind discriminating means having at least two kinds of input terminals for an HD signal and an NTSC signal;

a recording signal processing circuit;

a servo circuit;

control means for generating control output signals to set at least the recording signal processing circuit and the servo circuit into a predetermined mode on the basis of the result of the discrimination of the input signal kind discriminating means and a recording mode command, and for controlling at least the recording signal processing circuit and the servo circuit; and means for displaying a present recording mode on the basis of a control output signal which is generated from the control means;

wherein the control means generates a control output signal so as to make only recording modes of a preset combination of at least a kind of input signal and a recording mode effective in correspondence to an output of the input signal kind discriminating means and the recording mode command; and wherein when an initial setting state of the magnetic recording apparatus is selected, the control means generates a control output signal for setting a recording mode of the magnetic recording apparatus to a recording mode selected from a plurality of recording modes of preset available combinations of at least a kind of input signal and a recording mode ranked in an order of priority from a most optimum recording mode having a highest priority to a least optimum recording mode having a lowest priority, wherein a process of selecting a recording mode begins with the most optimum recording mode having the highest priority among the plurality of recording modes.

2. An apparatus according to claim 1, wherein in the case where only either one of the HD signal and the NTSC signal is supplied, the input signal kind discriminating means having the two kinds of input terminals for the HD signal and the NTSC signal determines that the input signal is an input signal to be recorded.

3. An apparatus according to claim 1, wherein in the case where both of the HD signal and the NTSC signal are supplied, the input signal kind discriminating means a having the two kinds of input terminals for the HD signal and the NTSC signal enables a user to select the input signal to be recorded.

4. An apparatus according to claim 1, wherein in the case where the input signal kind discriminating means discriminates the NTSC signal and the discriminated NTSC signal is recorded onto a magnetic tape for the HD signal, the control means generates a control output signal for setting a recording mode such that the NTSC signal is up-converted into a pseudo HD signal and recorded.

5. An apparatus according to claim 1, wherein the input signal kind discriminating means discriminates the kind of input signal based on a shape or a frequency of a sync signal in the input signal.

6. An apparatus according to claim 1, further comprising means for recording information indicative of an aspect ratio of a kind of input signal discriminated by the input signal kind discriminating means.

7. A magnetic recording apparatus of the rotary head helical scan type which can selectively record input information signals of a plurality of signal formats to a plurality of kinds of cassettes, comprising:

input signal kind discriminating means having at least two kinds of input terminals for an HD signal and an NTSC signal;

cassette kind discriminating means;

a recording signal processing circuit;

a servo circuit;

control means for generating control output signals so as to set at least the recording signal processing circuit and the servo circuit into a predetermined mode on the basis of the result of the discrimination of the input signal kind discriminating means, the result of the discrimination of the cassette kind discriminating means, and a recording mode command, and for controlling at least the recording signal processing circuit and the servo circuit; and means for displaying a present recording state on the basis of a control output signal which is generated from the control means;

wherein in correspondence to an output of the input signal kind discriminating means and the recording mode command, the control means generates a control output signal such as to make only the recording modes of a preset combination of at least a kind of input signal, a kind of cassette, and a recording mode effective; and wherein when an initial setting state of the magnetic recording apparatus is selected, the control means generates a control output signal for setting a recording mode of the magnetic recording apparatus to a recording mode selected from a plurality of recording modes of preset available combinations of at least a kind of input signal, a kind of cassette, and a recording mode ranked in an order of priority from a most optimum recording mode having a highest priority to a least optimum recording mode having a lowest priority, wherein a process of selecting a recording mode begins with the most optimum recording mode having the highest priority among the plurality of recording modes.

8. An apparatus according to claim 7, wherein in the case where only either one of the HD signal and the NTSC signal is supplied, the input signal kind discriminating means having the two kinds of input terminals for the HD signal and the NTSC signal determines that the input signal is an input signal to be recorded.

9. An apparatus according to claim 7, wherein in the case where both of the HD signal and the NTSC signal are supplied, the input signal kind discriminating means having the two kinds of input terminals for the HD signal and the NTSC signal enables a user to select the input signal to be recorded.

10. An apparatus according to claim 7, wherein in the case where the input signal kind discriminating means discriminates the NTSC signal and the cassette kind discriminating means discriminates an HD cassette and the discriminated NTSC signal is recorded onto a magnetic tape for the HD signal, the control means generates a control output signal for setting a recording mode such that the NTSC signal is up-converted into a pseudo HD signal and recorded.

11. An apparatus according to claim 7, wherein the cassette kind discriminating means discriminates the kind of cassette by a projection or a hole formed on/in the cassette.

12. An apparatus according to claim 7, wherein the cassette kind discriminating means discriminates the kind of cassette by a difference of magnetic characteristics of a magnetic tape in the cassette.

13. An apparatus according to claim 7, wherein the cassette kind discriminating means discriminates a difference between at least two kinds of cassettes having different shapes for HD and NTSC.

14. An apparatus according to claim 13, wherein intervals between reels in said two kinds of cassettes are equalized and a size of a cassette inserting window of the magnetic recording apparatus is set to a size large enough to insert the HD cassette.

15. An apparatus according to claim 13, wherein a preventing pin corresponding to an insertion preventing mechanism provided for each of said two kinds of cassettes is commonly used for both of said cassettes.

16. An apparatus according to claim 7, wherein the input signal kind discriminating means discriminates the kind of input signal based on a shape or a frequency of a sync signal in the input signal.

17. An apparatus according to claim 7, further comprising means for recording information indicative of an aspect ratio of a kind of input signal discriminated by the input signal kind discriminating means.

18. A magnetic recording apparatus comprising:

cassette receiving means for receiving a cassette selected from a plurality of kinds of cassettes including at least an NTSC cassette and an HDTV cassette, the cassette having a magnetic tape disposed therein;

cassette discriminating means for discriminating a kind of the cassette received by the cassette receiving means;

input means for receiving at least one input signal selected from a plurality of input signals including at least an NTSC signal and an HDTV signal;

input signal discriminating means for discriminating a kind of the at least one input signal received by the input means;

selecting means responsive to a first control signal for selecting one input signal from the at least one input signal received by the input means;

processing means responsive to a second control signal for processing the one input signal selected by the selecting means to produce a recording signal having a selected recording format, the selected recording format being selected from a plurality of recording formats including at least an NTSC format and an HDTV format;

rotary head helical scan recording means for recording the recording signal from the processing means on the magnetic tape in the cassette received by the cassette receiving means, the rotary head helical scan recording means including a servo circuit responsive to a third control signal for controlling the rotary head helical scan recording means to record the recording signal on the magnetic tape in the selected recording format;

display means for displaying all presently available recording modes based on the kind of cassette discriminated by the cassette discriminating means and the kind of input signal discriminated by the input signal discriminating means, wherein a recording mode represents a combination of kind of cassette, kind of input signal, and recording format, and wherein the presently available recording modes are displayed ranked in an order of priority from a most optimum recording mode having a highest priority to a least optimum recording mode having a lowest priority;

means for producing a recording mode command indicative of a recording mode selected by an operator; and control means for generating the first, second, and third control signals based on
 (1) the kind of cassette discriminated by the cassette discriminating means and the kind of input signal discriminated by the input signal discriminating means when there is only one available recording mode, and
 (2) the kind of cassette discriminated by the cassette discriminating means, the kind of input signal discriminated by the input signal discriminating means, and the recording mode command when there is more than one available recording mode.

19. An apparatus according to claim 18, further comprising means for recording information indicative of an aspect ratio of the kind of input signal discriminated by the input signal discriminating means on the magnetic tape in the cassette received by the cassette receiving means.

* * * * *